United States Patent [19]
Okada et al.

[11] Patent Number: 5,122,721
[45] Date of Patent: Jun. 16, 1992

[54] COMBINATION BATTERY CHARGER AND AC ADAPTER

[75] Inventors: Tetsuya Okada; Hideyo Morita, both of Sumoto, Japan

[73] Assignee: Sanyo Electric Co., Ltd., Moriguchi, Japan

[21] Appl. No.: 631,358

[22] Filed: Dec. 20, 1990

[30] Foreign Application Priority Data

Dec. 22, 1989 [JP] Japan ................................. 1-147946
Dec. 25, 1989 [JP] Japan ................................. 1-335552
Dec. 25, 1989 [JP] Japan ................................. 1-335553

[51] Int. Cl.$^5$ ............................................. H02J 1/00
[52] U.S. Cl. ......................................... 320/2; 320/5
[58] Field of Search ................. 320/2, 22, 23, 24, 5, 320/9, 14, 31, 32, 39, 40

[56] References Cited

U.S. PATENT DOCUMENTS 3,757,194  9/1973  Weber et al. ......................... 320/2

FOREIGN PATENT DOCUMENTS 0084024  3/1990  Japan ...................................... 320/2

OTHER PUBLICATIONS

Canon Video Camera Catalog, Canon, Inc. 1987.
Sony Operating Manual, AC Pack/Battery Charger, Sony Corporation, 1985.
Sony Operating Manual, DC Pack/Battery Charger, Sony Corporation, 1984.
Sony Operating Instructions for Compact Disc Player, Sony Corporation, 1988.

Primary Examiner—Steven L. Stephan
Assistant Examiner—Kristine Peckman
Attorney, Agent, or Firm—Morrison Law Firm

[57] ABSTRACT

A battery charger charges a discharged battery and can be connected directly to an appliance where it serves as an AC adapter. The output of the battery charger automatically reduces to a trickle maintenance charge as the battery approaches a full charge condition. A Zener diode, used for overcurrent protection automatically turns off the charging function in the event of an overcurrent condition. The circuit automatically resets when the overcurrent condition is removed. A hinged section, when opened out, provides mounting for a battery to be charged. When the hinged section is closed, switches are operated, and electrical connections are made to permit affixing the charger, as an AC adapter, to the normal battery retainer of the appliance.

8 Claims, 5 Drawing Sheets

COMBINATION BATTERY CHARGER AND AC ADAPTER

BACKGROUND OF THE INVENTION

The present invention relates to a device for charging batteries and, more particularly, to a device for charging batteries that also serves as an AC adapter to power a normally battery powered appliance, such as, for example, a video camera.

The use of such battery charger/AC adapters for small portable electrical appliances is well known. Japanese Laid-open Utility Model Publication No. 1-61839 discloses a battery charging device that can be adapted for connection to an electrical device by moving a lever in the device from a battery charging position to a power supply position. As disclosed in this publication, overcurrent protection for the device and its attached small appliance is provided solely by an overcurrent fuse. To return this device to service following an overcurrent condition, it must be opened and the fuse must be replaced. Another inconvenience associated with this device is that an additional accessory adapter cord is needed to use the device as a power source for an electrical appliance. The internal construction of this device is also complicated by the adapter lever and its associated internal switching.

Some battery chargers can be connected to their appliance to serve as an AC adapter. Such arrangements require a cable between the battery charger and the appliance, and an adapter at the appliance to mate the cable with the normal battery retainer and connector. The requirement for a cable is inconvenient, since such cables are easily lost. In addition, the need for a special adapter tends to increase the cost of manufacture of the system.

OBJECTS AND SUMMARY OF THE INVENTION

Accordingly, it is an object of the invention to provide a battery charger that overcomes the drawbacks of the prior art.

It is a further object of the present invention to provide a battery charger that can be adapted for direct connection to an electrical appliance without the use of an adapter cord.

It is still further object of the present invention to provide a battery charger that automatically shuts down during an overcurrent condition and automatically resets itself when the overcurrent condition is corrected.

Briefly stated, the present invention provides a battery charger for charging a discharged battery that can also be connected directly to an appliance where it serves as an AC adapter. The output of the battery charger automatically reduces to a trickle maintenance charge as the battery approaches a full charge condition. A Zener diode, used for overcurrent protection automatically turns off the charging function in the event of an overcurrent condition. The circuit automatically resets when the overcurrent condition is removed. A hinged section, when opened out, provides mounting for a battery to be charged. When the hinged section is closed, switches are operated, and electrical connections are made to permit affixing the charger, as an AC adapter, to the normal battery retainer of the appliance.

According to an embodiment of the invention, there is provided a combination battery charger and AC adapter comprising: means for producing a DC power, first means for physically attaching a battery to the combination, first means for feeding the DC power to the battery, second means for physically attaching the combination to an electrical appliance, second means for feeding the DC power to the electrical appliance, and the second means for physically attaching, and the second means for feeding providing a mechanical and electrical interface with the appliance that is the equivalent of a mechanical and electrical interface provided by the battery when affixed to the appliance.

According to a feature of the invention, there is provided a combination battery charger and AC adapter comprising: a main body, a hinged section, means for hinging the hinged section between first and second positions with respect to the main body, the first position extending the hinged section outward from the main body, at least one mounting tab on one of the hinged section and the main body, the at least one mounting tab being adapted for entering a mounting notch of a battery, at least one retractable latch tab in the other of the hinged section and the main body, the at least one retractable latch tab being adapted for entering a mounting notch of the battery when in an extended position, and for withdrawing therefrom when in a retracted position, whereby a battery may be installed and removed from the combination, at least one latch in the hinged section, the at least one latch being moved into alignment with the at least one retractable latch tab when the hinged section is hinged to the second position, the at least one retractable latch entering the at least one latch to retain the hinged section in the second position, and means for permitting physical and electrical attachment of an appliance to the combination when the hinged section is in the second position.

According to a feature of the invention, if DC output terminals of an AC adapter are short circuited for any reason, the output power to the DC terminals is automatically interrupted without the use of an overcurrent fuse.

The circuit comprises: a first transistor, the main current path of the first transistor connected to a positive line of the DC output terminal, a switch for switching between battery charging and AC adapter functions, a second transistor, a base terminal of the second transistor connected to a contact at the battery charger side of the switch, a main current path of the second transistor connected between the positive and negative output lines of the DC output terminals, a third transistor, a base terminal of the third transistor connected to a contact at the AC adapter function of the switch through a resister and a capacitor arranged in series, a main current path of said third transistor connected between the base terminal of the first transistor and the negative line of the DC output terminal, and a Zener diode connected between the base terminal of the third transistor and a negative line of the DC output terminal.

When setting the switch to the AC adapter contact, current is briefly supplied to the base terminal of the third transistor by the resister and capacitor series circuit, turning on the third transistor. As a result, the first transistor is turned on, supplying power to the DC output terminal. By presetting the breakdown voltage to a value that is smaller than the voltage at the DC output terminal, current is supplied to the base current of the third transistor through the Zener diode, This keeps the third transistor on, which, in turn keeps the first transistor on. If, for some reason, the voltage level at the DC output terminal drops below the breakdown voltage of the Zener diode, the Zener diode cuts off current to the base of the third transistor, turning off the main current path through the first transistor. This interrupts power to the DC output terminal.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
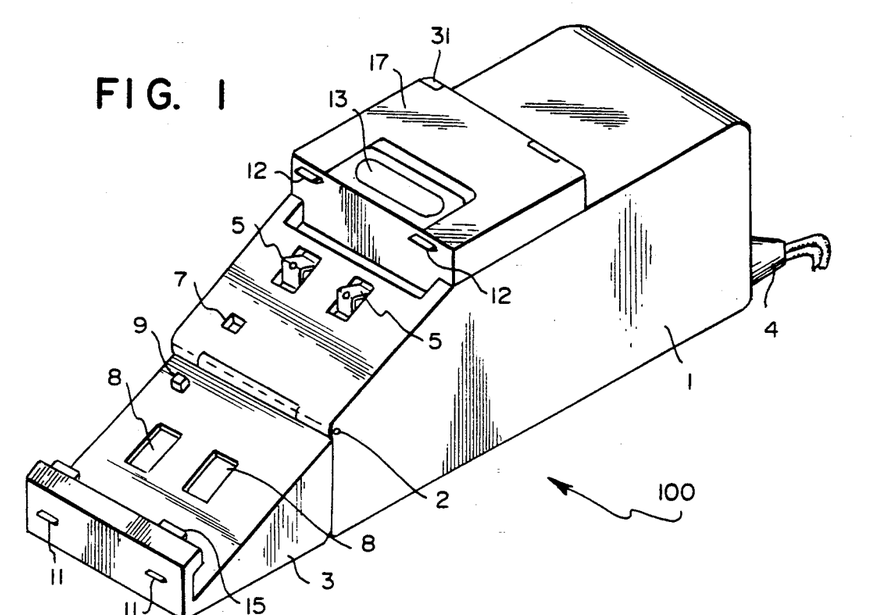
FIG. 1 is a perspective view of a preferred embodiment of the present invention.

Referring to FIG. 1, a battery charger 100 comprises a substantially rectangular main body 1 having a downward sloping forward portion and a substantially wedge shaped hinged section 3. Hinged section 3 terminates in a narrow edge in the shape of a "J." A hinge 2 disposed at an upper edge of the downward sloping portion of main body 1 swingably connects an upper rear edge of hinged section 3 to main body 1. Thus, hinged section 3 can be swung between an open first position shown and a closed second position. The open position is a battery charge position and the closed position is an AC adapter position. When in the open position, an upper surface of hinged section 3 forms a continuous slope with the downward sloping portion of main body 1.

A platform projection 17 begins at the starting edge of the downward sloping portion of main body 1 and extends about half the remaining distance to the rear of main body 1. An AC cord 4 extends from a rear side of main body 1 to allow battery charger 100 to be connected to utility power.

A pair of latch tabs 12 retractably project from an upper forward facing surface of platform projection 17. A release bar 13, disposed on a top surface of platform projection 17, retracts latch tabs 12 when pressed. A pair of mounting tabs 15 project inwardly from an inward facing edge of the "J" of hinged member 3.

Figures 2, 3:
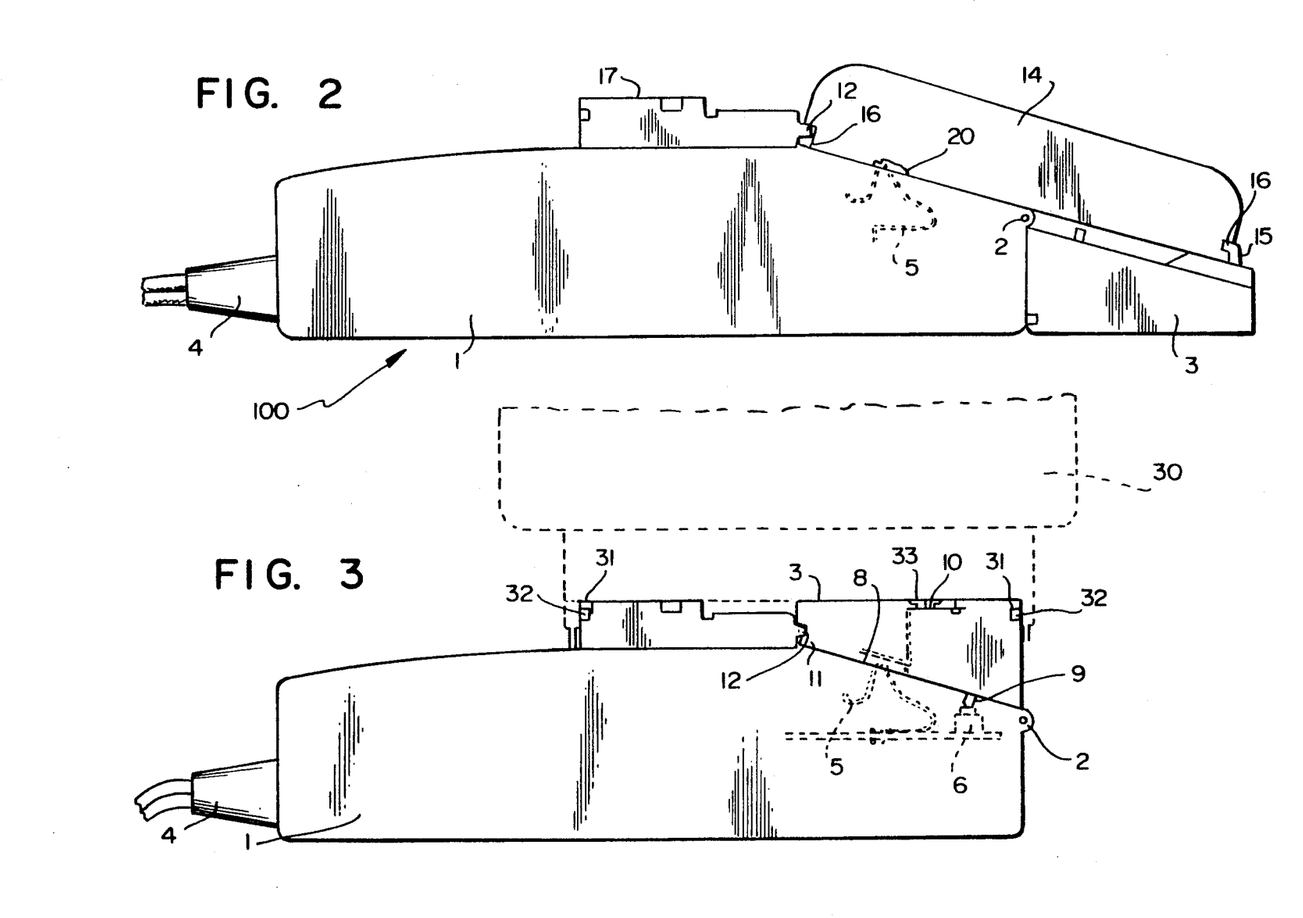
FIG. 2 is a side view of the present invention with a battery pack installed and electrical contacts shown in dashed line.
FIG. 3 is a side view of the present invention installed on a video camera showing the video camera, electrical contacts and switching in dashed line.

Referring to FIG. 2, mounting tabs 15, together with latch tabs 12 hold a battery pack 14 in place for charging by engaging mounting notches 16 of battery pack 14. A pair of resilient contacts 5 (only one of which is shown in FIG. 2), disposed in an upper area of the downward sloping portion of main body 1, mate with battery electrical contacts 20 of battery pack 14 being charged.

Referring again to FIG. 1, a switching port 7 on the downward sloping portion of main body 1 is positioned to receive a switch operator 9, which projects from the sloping surface of hinged section 3. A pair of recessed contacts 8 on the sloping surface of hinged section 3 mate with contacts 5 when hinged section 3 is in the closed position.

Referring now to FIG. 3, with hinged section 3 in the closed position, contacts 5 meet recessed contacts 8 and switch operator 9 enters switching port 7 to push in a switch actuator 6. A pair of latches 11 on an end of hinged section 3 opposite hinge 2 (FIG. 1) are engaged by latch tabs 12 to secure hinged section 3 in the closed position. As indicated in dashed line, recessed contacts 8 are connected to appliance contacts 10 at the top surface of hinged section 3. The resilience of contacts 5 performs a secondary function. When release bar 13 is pressed to retract latch tabs 12, the resilience of contacts 5 urges hinged section 3 towards the open position.

Figures 4, 5, 6:
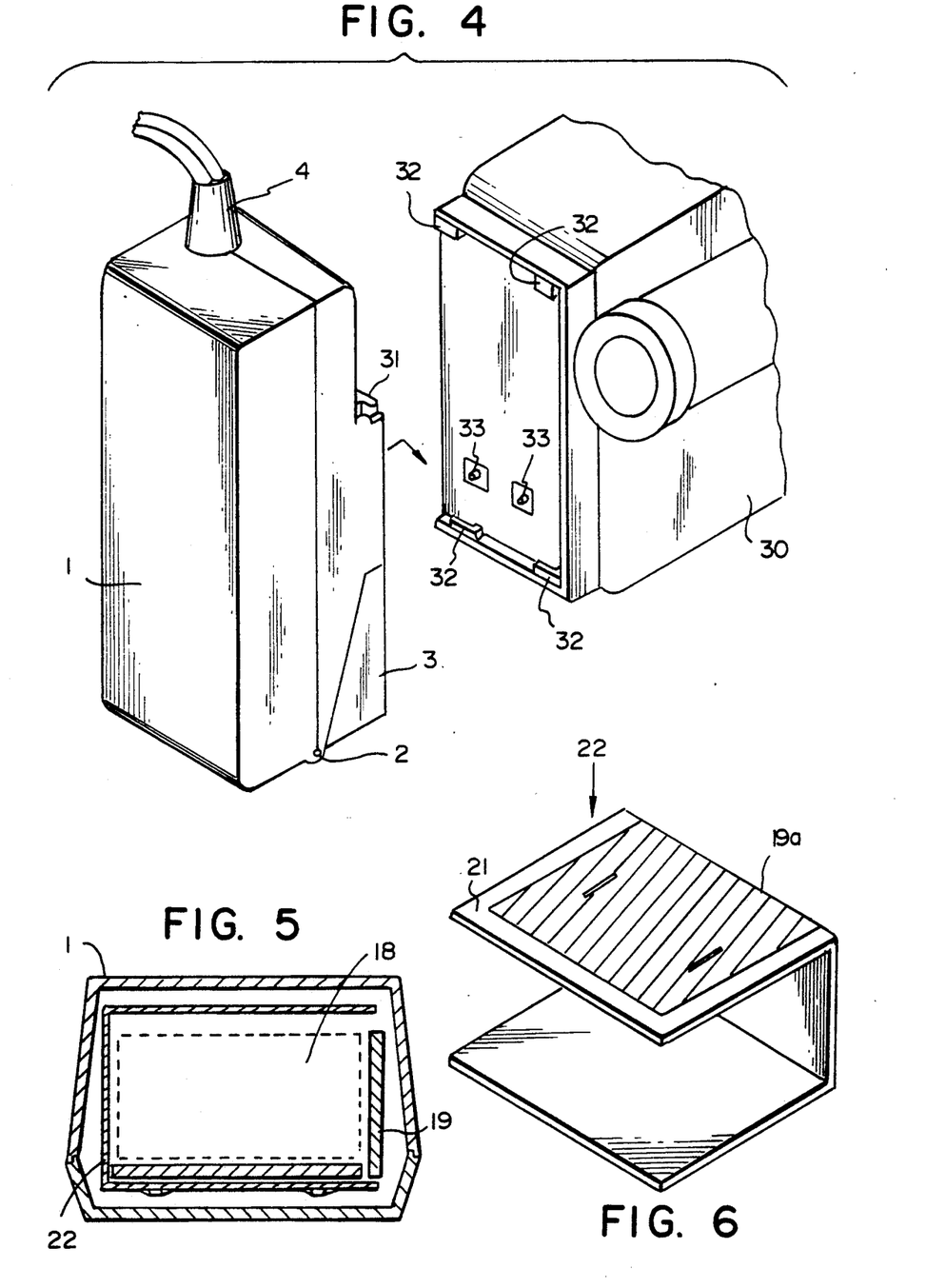
FIG. 4 is a perspective view of the present invention configured for mounting on a video camera.
FIG. 5 is a cross-section of the present invention.
FIG. 6 is a perspective view of a shield plate of the present invention.

Referring now to FIGS. 3 and 4, when attaching battery charger 100 to an appliance 30, four mounting tabs 31 engage appliance mounts 32. Two mounting tabs 31 are on a rear edge of platform projection 17 and two are on the hinged side of hinged section 3 on an edge away from hinge 2. With battery charger 100 attached to appliance 30, appliance electrical contacts 33 make contact with appliance contacts 10 on battery charger 100.

Referring to FIG. 5, a cross-section of main body 1 shows a power supply 18 installed in main body 1. Two radiating plates 19 are disposed along one side and the bottom of power supply 18 for heat radiation. A "U"-shaped shield plate 22 is placed around power supply 18 to provide electrical shielding.

Referring to FIG. 6, shield plate 22 is a resinous plate 21 having a copper foil 19a laminated on its outer surface.

Figure 7:
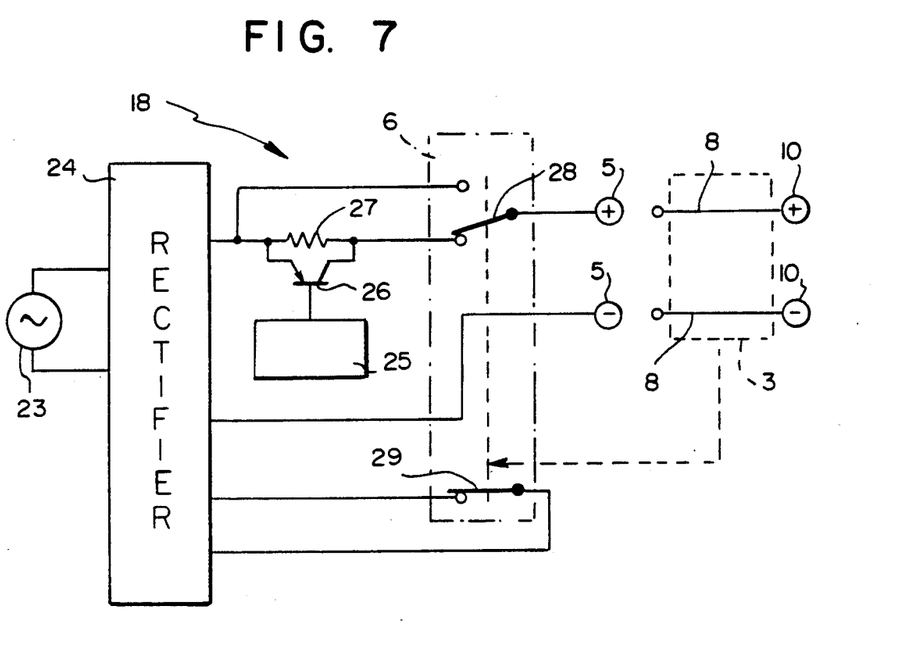
FIG. 7 is a schematic diagram of the charging circuit of the present invention.

Referring to FIG. 7, power supply 18 is connected to an AC input source 23, such as a utility outlet, through AC cord 4. The AC source current is connected to a rectifier 24 that converts the AC source current to DC at a voltage necessary to either operate appliance 30 or charge battery pack 14.

A positive output of rectifier 24 is connected to a junction of an emitter of a series pass transistor 26, a first side of a trickle resistor 27 and a normally open contact of a positive switch segment 28 of switch actuator 6. A second side of trickle resistor 27 is connected to a junction of a collector of series pass transistor 26 and a normally closed contact of positive switch segment 28. An arm of positive switch segment 28 is connected to a positive (+) contact 5. A base of series pass transistor 26 is connected to a control output of a microcomputer 25. A normally closed contact of positive switch segment 28 of switch actuator 6 is connected to rectifier 24, as is an arm of series pass transistor 26. A negative output of rectifier 24 is connected to a negative (−) contact 5. A pair of recessed contacts 8 of hinged section 3 contacting positive and negative contacts 5 connect them to appliance contacts 10 when an appliance 30 (not shown) is to be powered.

When battery charger 100 is being used to charge a battery (not shown), positive switch segment 28 and a negative switch segment 29 of switch actuator 6 are in a normally closed position, as shown. In this position, positive DC from rectifier 24 is connected through series pass transistor 26 and trickle resistor 27 that is connected across the emitter and collector of series pass transistor 26. Microcomputer 25, connected to a base of series pass transistor 26, controls the conductivity of series pass transistor 26 to regulate flow of the charging DC. The regulated positive DC is connected to positive contact 5 through positive switch segment 28. DC return is connected from rectifier 24 through negative switch segment 29 from which it is returned to rectifier 24 and then connected by rectifier 24 to negative contact 5.

When a battery is being charged, microcomputer 25 drives series pass transistor 26 into saturation, connecting a large flow of current to the battery for rapid charging. The current flow through trickle resistor 27 at this time is negligible. As the battery approaches a fully charged condition, series pass transistor 26 is turned off by microcomputer 25, and a full battery charge is maintained by a trickle current through trickle resistor 27.

When power supply 18 is supplying power to an appliance (not shown), positive switch segment 28 and negative switch segment 29 of switch actuator 6 are set to the normally open position. DC from rectifier 24 bypasses series pass transistor 26 and trickle resistor 27 and is connected through positive switch segment 28 and negative switch segment 29, and positive and negative contacts 5 respectively, to positive and negative appliance contacts 10.

Referring to FIGS. 2 and 7, when battery pack 14 is to be charged, hinged section 3 is placed in the open position and battery pack 14 is attached to battery charger 100 and secured by latch tabs 12 and mounting tabs 15. Battery electrical contacts 20 are now in contact with contacts 5. AC cord 4 is connected to AC input source 23 and AC utility power is converted to DC by rectifier 24. The DC output of rectifier 24 is connected through series pass transistor 26 to the normally closed contact of positive switch segment 28 under the control of microcomputer 25. When battery pack 14 approaches full charge, microcomputer 25 turns series pass transistor 26 off, and a trickle charge continues to flow to the normally closed contact of positive switch segment 28 through trickle resistor 27. The charging current is then connected through normally closed contacts of positive switch segment 28 and negative switch segment 29, to positive and negative contacts 5, which are in contact with battery electrical contacts 20.

Referring to FIGS. 3, 4 and 7, when appliance 30 is to be operated with battery charger 100, hinged section 3 is put in the closed position and battery charger 100b is secured to appliance 30 by mounting tabs 31 on battery charger 100 and appliance mounts 32 on appliance 30. With hinged section 3 in the closed position, positive switch segment 28 and negative switch segment 29 of switch actuator 6 are switched by switch operator 9. AC utility power connected to power supply 18 by AC cord 4 is rectified by rectifier 24. The resultant DC is connected through normally open contacts of positive switch segment 28 and negative switch segment 29 to the positive and negative contacts 5, respectively. The DC at contacts 5 is connected through recessed contacts 8 and positive and negative appliance contacts 10 of hinged section 3 to a pair of appliance electrical contacts 33.

Figure 8:
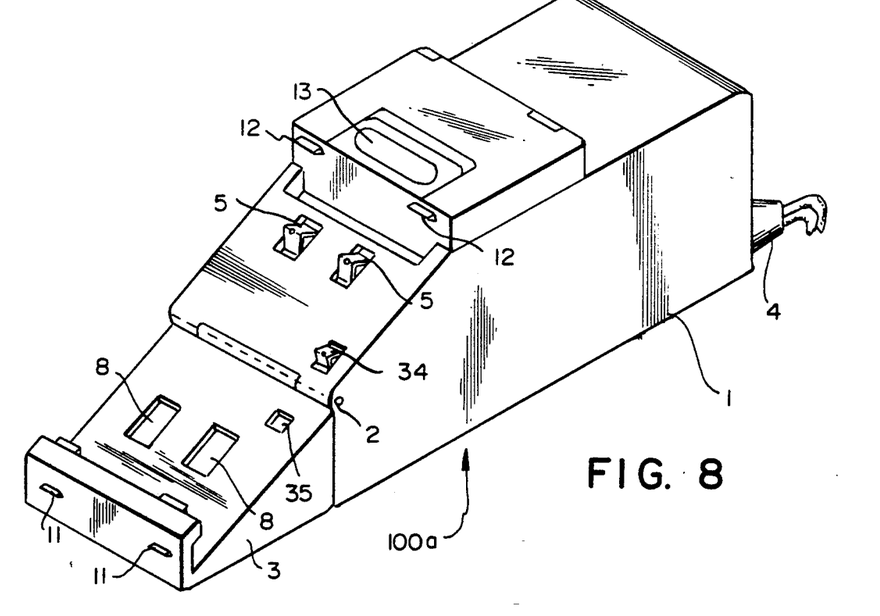
FIG. 8 is another embodiment of the present invention.
Figure 9:
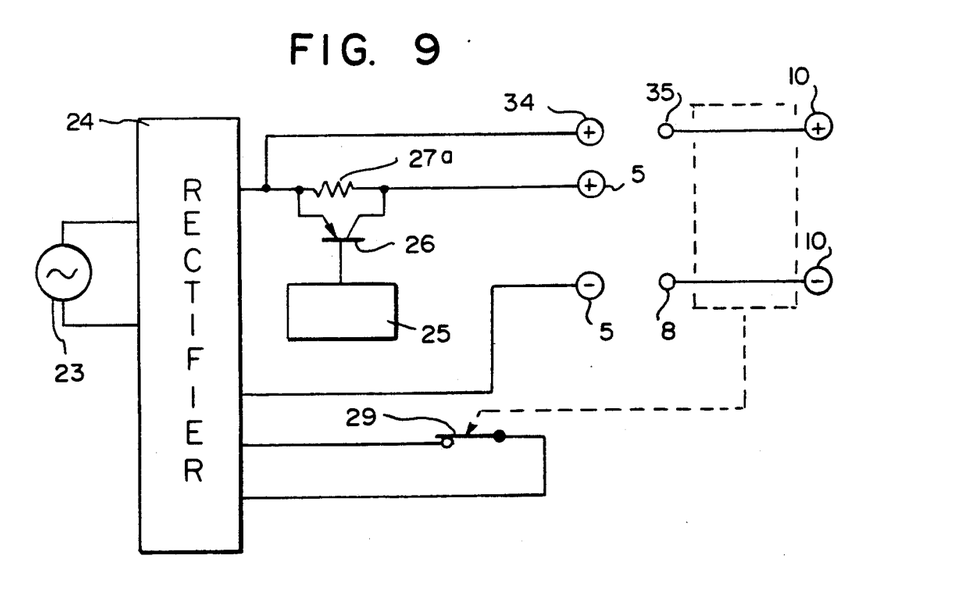
FIG. 9 is another embodiment of the charging circuit used in the present invention.

Referring to FIGS. 8 and 9, a battery charger 100a is shown according to a second embodiment of the present invention. Battery charger 100a is similar to the embodiment described with respect to FIGS. 1, 2 and 7, except as follows. A third resilient contact 34 is installed on a downward sloping portion of a main body 1a, and a recessed contact 35 is on a hinged section 3a. Recessed contact 35 is so positioned that when hinged section 3a is in a closed position, as previously described with respect to FIGS. 1 and 2, contact 34 and recessed contact 35 are pressed together to make electrical contact.

Referring to FIG. 9, in this embodiment, when hinged section 3a is in the closed position, and battery charger 100a is being used to power appliance 30, rectifier 24 of power supply 18a connects positive DC operating current from rectifier 24 of a power supply 18a to contact 34. Contact 34 connects the positive DC to positive appliance contact 10 connector through recessed contact 35. This arrangement eliminates the need for positive switch segment 28 used in the embodiment described with respect to FIG. 8. In all other respects, the operation of the two embodiments is identical. Eliminating positive switch segment 28 both simplifies the electrical circuit of power supply 18a and allows battery charger 100a to be made smaller. Another major advantage of the second embodiment is that the reliability of battery charger 100a is enhanced by the elimination of a switch element.

Figure 10:
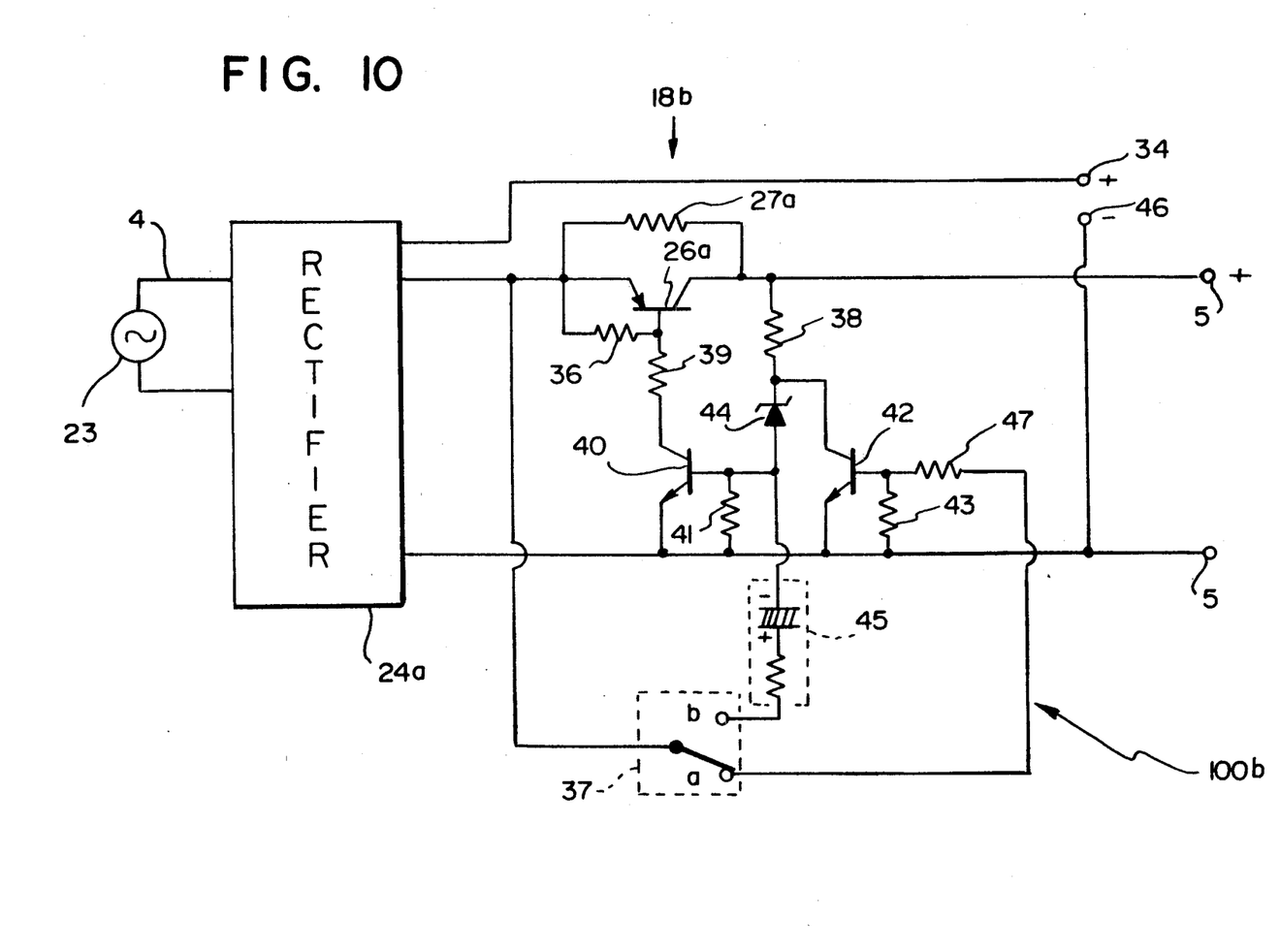
FIG. 10 is a schematic diagram of the charging circuit of still another embodiment of the present invention.

Referring to FIG. 10, in a third embodiment of the invention, a power supply 18b is used to power a battery charger 100b. An AC input source 23 is connected by AC cord 4 to a rectifier 24a. A first positive output of rectifier 24a connects a positive DC to contact 34 for operating power to an appliance (not shown). A second positive output of rectifier 24a connects the positive DC to a junction of an emitter of a series pass transistor 26a, a first side of a trickle resistor 27a, a first side of a voltage divider resistor 36 and an arm of a switch 37. A collector of series pass transistor 26a connects to a junction of a second side of trickle resistor 27a, a first side of a dropping resistor 38, and a positive contact 5. A base of series pass transistor 26a connects to the junction of a second side of voltage divider resistor 36 and a first side of a voltage divider resistor 39. A second side of voltage divider resistor 39 connects to a collector of a driver transistor 40.

A negative output of rectifier 24a is connected to a negative contact 5 and a negative contact 46. The negative output of rectifier 24a is also the return line for an emitter of driver transistor 40. A first side of a bias resistor 41, a base of sensor transistor 42 and a first side of a bias resistor 43 are also connected to the negative output of rectifier 24a. A second side of bias resistor 41 is connected to a base of driver transistor 40, an anode of a Zener diode 44 and a negative terminal of a series RC network 45. A positive terminal of RC network 45 connects to a normally open contact b of switch 37.

Normally closed contact a of switch 37 is connected to a first side of a sensor resistor 47. A second side of sensor resistor 47 is connected to a junction of a base of sensor transistor 42 and a second side of bias resistor 43. A collector of sensor transistor 42 is connected to a junction of a second side of dropping resistor 38 and a cathode of Zener diode 44.

When a battery pack 14 is being charged, hinged section 3 is in the open position and battery pack 14 is mounted on the surface formed by hinged section 3 and main body 1. Switch 37 is placed in position a for battery charging. AC input terminal 23 is converted to DC by rectifier 24a and the DC current is supplied to charging contact 34. At the same time, a base current supplied to second transistor 42 through switch 37 turns on the second transistor. As a result, the base terminal of third transistor 40 is pulled down to ground, holding third transistor 40 off and thereby holding first transistor 26a off. Because the value of resister 27a connected across the main current path of first transistor 26a is very large (100K ohms) relative to the very low resistance of the main current path of first transistor 26a, no power is connected to output terminals 5 while battery 14 is being charged.

When a video camera 30 is to be powered, hinged section 3 is closed and battery charger 100 is mounted to camera 30. In this arrangement, switch 37 is placed in position b, and AC is input at terminal 23 and converted to DC by rectifier 24a. A base current is momentarily connected to the base of third transistor 40 by resister and capacitor series circuit 45, turning on third transistor 40, which in turn turns on first transistor 26a to apply power to DC output terminal 5.

When the breakdown voltage of Zener diode 44 is lower than the DC voltage level at DC output terminal 5, it conducts, holding third transistor 40 on, which in turn holds first transistor on, continuing the supply of DC current to DC terminal 5. If a short circuit should occur, at the instant that the voltage at DC terminal 5 drops below the break down voltage of Zener diode 44, it stops conducting, removing base current from third transistor 40. With third transistor 40 turned off, base current to first transistor 26a is removed turning off first transistor 26a removing power to DC output terminal 5.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A combination battery charger and AC adapter comprising:
   means for producing a DC power;
   means for physically attaching a battery to said combination;
   first means for feeding said DC to said battery;
   second means for physically attaching said combination to an electrical appliance;
   second means for feeding said DC power to an electrical appliance;
   said second means for physically attaching and said second means for feeding providing a mechanical and electrical interface with said appliance that is the equivalent of a mechanical and electrical interface provided by said battery when affixed to said appliance;
   a main body;
   a hinged body on said main body;
   means for permitting rotating of said hinged section with respect to said main body between a first position and a second position;
   said hinged section, when in its second position, providing said second means for physically attaching, and said second means for feeding;
   said hinged section, in said first position, extending outward from said main body;
   at least one latch tab on one of said hinged section and said main body;
   said at least one latch tab being enterable into a mounting latch of said battery;
   at least one retractable latch tab in the other of said hinged section and said main body;
   said at least one retractable latch tab being enterable into a second mounting notch of said battery;
   said at least one latch tab being effective to physically affix said battery in a predetermined position on said combination;
   first and second electrical contacts carried in said combination and positioned therein to be engaged by electrical contacts on said battery when said battery is mounted to the combination; and
   resilient means for urging said first and second electrical contacts into electrical connection with said corresponding electrical contacts.

2. The combination of claim 1, wherein:
   said hinged section, when in said second position, folds against a surface of said main body;
   cooperating means in said hinged section, and said main body, for connecting said DC power to contacts on an external surface of said hinged section;
   a physical shape of a portion of said external surface substituting for said battery on said appliance; and
   said contacts facing cooperating contacts on said appliance, when installed; and
   means for physically securing said combination to said appliance.

3. The combination of claim 2, wherein said cooperating means includes:
   resilient contacts in one of said hinged section and said main body, facing the other thereof;
   mating contacts in the other of said hinged section and said main body, said mating contacts contacting said resilient contacts when said hinged section is in said second position; and
   a resilience of said resilient contacts being effective for urging said hinged section from said second position when said means for physically securing is released.

4. The combination of claim 2, wherein said cooperating means includes:
   a switch actuator on said hinged section facing said main body when said hinged section is in said second position;
   a switch in said main body;
   said switch being actuated by said switch actuator when said hinged section is in said second position; and
   means, responsive to actuation of said switch for switching said means for producing a DC power from a battery charge mode to an AC adapter mode.

5. The combination of claim 4, wherein:
   said combination includes a current regulator; and
   means, responsive to actuation of said switch, for actuating said current regulator.

6. The combination of claim 2, wherein:
   said main body includes first, second and third resilient contacts;
   said first and second resilient contacts contacting cooperating contacts on said battery, when said hinged section is in said first position;
   first and second contacts in said hinged section;

said first and third resilient contacts contacting said first and second contacts when said hinged section is in said second position;
a current regulator in series with one of said first and second resilient contacts; and
said third resilient contact and the other of said first and second resilient contacts being connected directly to said means for producing a DC power.

7. A combination battery charger and AC adapter comprising:
a main body;
a hinged section mounted to the main body;
said hinged section being movable between first and second positions with respect to said main body;
said first position extending said hinged section outward from said main body;
at least one mounting tab on one of said hinged section and said main body;
said at least one mounting tab being receivable in a mounting notch of a battery;
at least one retractable latch tab in the other of said hinged section and said main body;
said at least one retractable latch tab being receivable in another mounting notch of said battery when in an extended position, and removable therefrom when in a retracted position, whereby a battery may be installed and removed from said combination;
at least one latch in said hinged section;
said at least one latch being moved into alignment with said at least one retractable latch tab when said hinged section is rotated to the second position;
said at least one retractable latch entering said at least one latch to retain said hinged section in said second position; and
means for permitting physical and electrical attachment of an appliance to said combination when said hinged section is in said second position.

8. A combination battery charger and AC adapter having an AC adapter function for supplying DC to a DC output terminal by converting AC power to DC power and a battery charger function for charging a removable battery, comprising:
a first transistor;
a main current path of said first transistor connected to a positive line of a DC output terminal;
a switch for switching between said battery charger function and said AC adapter function;
a second transistor;
a base terminal of said second transistor connected at a battery charger contact of said switch; a main current path of said second transistor connected between said positive output line of said DC output terminal and a negative output line of said DC output terminal;
a third transistor;
a base terminal of said third transistor connected to an AC adapter contact of said switch through a series connected resister and capacitor;
a main current path of said third transistor connected between a base terminal of said first transistor and said negative line of said DC output terminal; and
a Zener diode connected between said base terminal of said third transistor and said negative line of said DC output terminal.

* * * * *